United States Patent [19]

Watanabe et al.

[11] Patent Number: 5,214,120
[45] Date of Patent: May 25, 1993

[54] DOPE FOR FORMING ELASTIC POLYURETHANE ARTICLES AND PROCESS FOR PRODUCING SAID ARTICLES

[75] Inventors: Youichi Watanabe; Yoshikazu Arimatsu; Hajime Suzuki, all of Ootsu, Japan

[73] Assignee: Toyo Boseki Kabushiki Kaisha, Osaka, Japan

[21] Appl. No.: 844,537

[22] Filed: Mar. 2, 1992

[30] Foreign Application Priority Data

Mar. 1, 1991 [JP] Japan .................................. 3-061215

[51] Int. Cl.$^5$ ............................................. C08G 18/32
[52] U.S. Cl. ........................................ 528/49; 528/51; 528/53; 528/59; 528/61; 524/700; 524/708; 524/726

[58] Field of Search ................. 528/49, 51, 53, 59, 528/61; 524/700, 708, 726

[56] References Cited

U.S. PATENT DOCUMENTS 4,108,842 8/1978 König et al. .

FOREIGN PATENT DOCUMENTS 149765 7/1985 European Pat. Off. .

Primary Examiner—Maurice J. Welsh
Attorney, Agent, or Firm—Wegner, Cantor, Mueller & Player

[57] ABSTRACT

A dope for forming elastic polyurethane articles is prepared by using a polyol, a diisocyanate and a diamine. A solvent and a terminating agent comprising a secondary monoamine and a ketoimineamine and/or an aldoimine-amine may also be employed.

2 Claims, No Drawings

DOPE FOR FORMING ELASTIC POLYURETHANE ARTICLES AND PROCESS FOR PRODUCING SAID ARTICLES

This invention relates to a dope for forming elastic polyurethane articles, and to a process for producing elastic polyurethane articles by using the same. More particularly, it relates to a dope for forming elastic polyurethane articles which are excellent in physical properties, such as modulus and recovery properties, and hardly suffer from changes in these physical properties, and also relates to a process for producing elastic polyurethane articles by using the same.

As the attempt to improve the physical properties of polyurethane articles by further enhancing the molecular weight, are known the methods disclosed in U.S. Pat. No.3,557,044 and British Patent No.1,102,819(A). These methods employ the technique of using a solution of a polyurethane having, as the terminal groups, an amino group and an isocyanate group blocked with a low-molecular, secondary monoamine, and heating said solution in the dry spinning and the post-treatment steps to cause the replacement reaction between the two terminal groups, thereby further enhancing the molecular weight.

In producing elastic polyurethane articles by these methods, a solution of a prepolymer having two isocyanate terminal groups is allowed to react with a solution containing a primary diamine and a secondary monoamine in amounts at least equimolar to the amount of the isocyanate groups to effect chain extending reaction, and the solution of elastic polyurethane thus formed is heated in the dry spinning and post-treatment steps, thereby further enhancing the molecular weight. If the difference in molecular weight between the polyurethanes before and after the spinning and post-treatment steps is defined as "postpolymerizability", the level of this value is determined by the ratio of the primary diamine to the secondary monoamine used in the chain extending reaction.

The methods described above improve the physical properties of elastic polyurethane articles, but the difference in "post-polymerizability" entails changes in physical properties. In addition, the amino group and the isocyanate group blocked with a secondary monoamine, which are the terminal groups of the polyurethane molecule, can react with each other even at room temperature; hence, the packages of spinned fibers involve the problems that some difference in molecular weight of spinned fiber is observed among packages with different passage of time after spinning, and that some difference is also observed between the internal and external layers of any package, thus causing changes in the physical properties of the fibers.

Meanwhile, the technique of using a ketoimine-amine and an aldoimine-amine is known; U.S. Patent No.4,108,842 and European Patent No.149,765(A) proposed processes for producing elastic polyurethane articles by the use of a ketoimine-amine and aldoimine-amine. These techniques are different from each other in the presence or absence of solvent and in other conditions in the manufacturing process of elastic polyurethane articles, but any of these employs a ketoimine-amine and an aldoimine-amine in place of a diamine in order to lower the reaction rate between the isocyanate groups in the prepolymer and diamine.

SUMMARY OF THE INVENTION

The object of this invention is to provide a process for producing elastic polyurethane articles which cause "post-polymerization" under heated conditions alone, unlike the elastic polyurethane articles produced by the conventional methods which cause "post-polymerization" even at room temperature, that is, a novel process for easily producing elastic polyurethane articles which hardly suffer from changes in physical properties unlike those obtained by the conventional methods.

DETAILED DESCRIPTION OF THE INVENTION

This invention relates to a dope for forming elastic polyurethane articles prepared by reaction of a prepolymer, made of a polyol and an excessive amount of a diisocyanate as main reaction components, with a diamine in a solvent to effect chain extending reaction, and to a process for producing elastic polyurethane articles by using the dope obtained above. The above chain extending reaction of this invention is characterized by the use of a terminating agent comprising (a) a secondary monoamine and (b) a ketoimineamine and/or an aldoimine-amine.

The ketoimine-amine and/or aldoimine-amine used in this invention are mixtures composed of compounds (A), (B) and (C) represented by the following general formulas, in which compound (B) is the main component,

$$H_2N-R-NH_2 \quad (A)$$

$$H_2N-R-N=R_1 \quad (B)$$

$$R_1=N-R-N=R_1 \quad (C)$$

wherein R is a divalent, aliphatic or alicyclic group with a carbon number of 2 to 18 which may optionally contain a radical of $-N(R_2)-$ ( in which R is $-H$, $-CH_3$, $-C_2H_5$, $-C_3H_7$, or $-C_4H_9$); and $R_1$ is an aliphatic group formed by removing oxygen atom from a ketone or an aldehyde of 2 to 8 carbon atoms ).

The elastic polyurethane articles of this invention can be obtained by dissolving a prepolymer having isocyanate groups as both of the terminal groups, made of a polyol and an excessive amount of a diisocyanate, in a polar solvent, such as N,N-dimethylacetamide, N,N-dimethylformamide and hexamethylphosphoramide, and performing chain extending reaction with a diamine by using, as the terminating agent, a secondary monoamine and a ketoimine-amine and/or an aldoimine-amine obtained by reaction of a diamine and a ketone or an aldehyde.

As the polyol in this invention, may be used any polyols commonly employed for the manufacture of elastic polyurethane articles, such as poly(tetramethylene ether)glycol, polyethylene adipate, polybutylene adipate and polycaprolactone having hydroxyl groups as both of the terminal groups; there is no specific limitation upon its molecular weight, but a molecular weight in the range from 1000 to 3000 is preferable to obtain elastic polyurethane articles having satisfactory physical properties.

As the diisocyanate, should preferably be used an aromatic diisocyanate, such as diphenylmethane 4,4'-diisocyanate, toluene-2,4-diisocyanate and toluene-2,6-diisocyanate.

Such a polyol is mixed with such a diisocyanate in an amount of 1.5 to 3.0 molar proportions, and the mixture is heated at a temperature in the range from 60 to 120° C., thus giving a prepolymer. In this case, two or more kinds of polyols and diisocyanates may be used to perform copolymerization, insofar as the physical properties of elastic polyurethane articles obtained are not adversely affected. Furthermore, a low-molecular diol, such as ethylene glycol, propylene glycol and butanediol, may also be copolymerized.

The prepolymer thus obtained is cooled down to a temperature of 40° C. or lower, and dissolved in a polar solvent, such as N,N-dim ethylacetamide, N,N-dimethylformamide and hexamethylphosphoramide.

To the prepolymer solution thus obtained, is added a diamine dissolved in a polar solvent, such as N,N-dimethylacetamide, N,N-dimethylformamide and hexamethylphosphoramide to perform chain extending reaction.

As preferable examples of the diamine, may be mentioned ethylenediamine, 1,2-diaminocyclohexane, 1,3-diaminocyclohexane, 1,4-diaminocyclohexane, propylenediamine and hydrazine.

Simultaneously to or before and after this reaction with a diamine, is performed a terminating reaction by the use of a secondary monoamine, and a ketoimine-amine and/or an aldolimine-amine.

The ketoimine-amine and aldoimine-amine can be easily obtained by reaction of a ketone or an aldehyde, such as acetone and methyl ethyl ketone, with a diamine, such as ethylenediamine and propylenediamine, at an elevated temperature, as described in U.S. Pat. No.4,108,842 and European Patent No.149,765(A).

As preferable examples of the secondary monoamine, may be mentioned diethylamine, diisopropylamine, di-n-butylamine and dicyclohexylamine.

When performing the chain extending reaction by the continuous process, the prepolymer solution is mixed with a solution containing a diamine, a ketoimine-amine and a secondary monoamine in amounts of higher equivalent proportions than that of the isocyanate groups with vigorous stirring by the use of a mixer. In this case, part or all of the ketoimine-amine and secondary monoamine may be allowed to react before and/or after the reaction of the diamine.

When performing the chain extending reaction by the batch process, a solution containing a diamine, a ketoimine-amine and a secondary monoamine in amounts of a little more excessive equivalent proportions than that of the isocyanate groups is added to the prepolymer solution. In this case, part or all of the ketoimine-amine and/or secondary monoamine may be allowed to react before the chain extending reaction, and none of these amines may be absent in the chain extending reaction system.

Any other reaction processes may also be employed, insofar as the secondary monoamine and ketoimine-amine and/or aldoimine-amine are allowed to react with the isocyanate groups left in the prepolymer.

When the equivalents of the diamine, the secondary monoamine, and the ketoimine-amine and/or aldoimine-amine used in this invention are expressed by X, Y and Z, respectively, it is preferable that the ratio of Y/(X+Y+Z) be 0.02 to 0.45 (more preferably 0.065 to 0.20), the ratio of Z/(X+Y+Z) be 0.03 to 0.4 . (more preferably 0.065 to 0.20), and the ratio of Y/Z be 0.3 to 5.0 (more preferably 0.6 to 1.8).

The elastic polyurethane solution thus obtained is subjected to dry spinning or casting to form fiber or film of this polymer, and heating this fiber or film causes replacement reaction between the terminal isocyanate group blocked with a secondary monoamine and the terminal ketoimine and/or aldoimine group of the polymer, thus further enhancing the molecular weight through "post-polymerization".

The processes for producing elastic polyurethane articles by the use of a ketoimine-amine and aldoimine-amine proposed by U.S. Pat. No. 4,108,842 and European Patent No. 149,765(A) both employ the ketoimine-amine and aldoimine-amine to retard the reaction between the diamine and the isocyanate groups of the prepolymer; in contrast, the process of this invention effects the replacement reaction between the terminal isocyanate group blocked with a secondary monoamine and the terminal ketoimine group and/or terminal aldoimine group of the polymer. Hence, this invention is essentially different from the above patents in terms of both object and process.

EXAMPLES

The following Examples will further illustrate the invention, but are not intended to limit its scope.

Synthesis of Ketoimine-amines

Ketoimine-amines can be obtained by reaction of ethylenediamine with an equimolar amount of acetone, methyl ethyl ketone, diethyl ketone or methyl n-propyl ketone at 50° C. for ten hours.

Analysis by liquid chromatography showed that any of the ketoimine-amines thus obtained is a mixture of a bisketoimine formed by reaction of a ketone at both terminals of ethylenediamine, a ketoimine-amine formed by reaction of a ketone at one of the terminals of ethylenediamine, unreacted ethylenediamine and unreacted ketone, in which the content of ketoimine-amine is at least 70%. This mixture was used for the succeeding reaction with no aftertreatment.

Measurement of Inherent Viscosity

The polymer to be tested ( 0.075 g ) is dissolved in 25 ml N,N-dimethylacetamide, 10 ml of this solution is put in an Ostwald viscometer, the falling time ( sec. ) is measured, and the inherent viscosity ( $\eta_{inh}$) is calculated according to the following formula:

$$\eta_{inh} = \{l_n(t/t_0)\}/C$$

t : Falling time of the polymer solution (sec.)

$t_0$: Falling time of the solvent (sec.)

C : Polymer concentration (g/dl)

Measurement of "Post-Polymerizability"

An elastic polyurethane solution is cast into water to form polymer film, which, after removal of the solvent, is dried at room temperature for 24 hours in the nitrogen atmosphere, giving as-cast film.

The as cast film thus obtained is then aged at 45° C. for a week, thus giving aging film, and the difference in $\eta_{inh}$ between the as-cast film and the aging film is expressed as $\Delta IV_a$.

The as-cast film is immersed in boiling water for one hour and dried at room temperature for 24 hours in the nitrogen atmosphere ( under conditions of assumed aftertreatment ), thus giving boiling-water treated film, and the difference in $\eta_{inh}$ between the as-cast film and the boiling-water treated film is expressed by $\Delta IV_b$.

The larger the values of $\Delta IV_b$, the higher the degree of "post-polymerizability". Furthermore, when the ratio of $\Delta JV_a/\Delta IV_b$ is smaller, the degree of "post-polymerizability" at temperatures close to room temperature is lower and the degree of "post-polymerizability" at elevated temperatures in the after-treatment step is higher, and this means a preferable article of elastic polyurethane.

EXAMPLE 1

Reaction of 59.29 g poly(tetramethylene ether) glycol having a molecular weight of 1830 with 12.52 g diphenylmethane-4,4'-diisocyanate at 105° C. for 1.5 hours formed a prepolymer having isocyanate groups as both of the terminal groups, which was cooled to 10° C. and dissolved in 125 g N,N-dimethylacetamide. To this solution, was added dropwise a solution of 0.95 g ethylenediamine and 0.07 g diethylamine in 25 g dimethylacetamide with stirring, and it was observed that the viscosity gradually increased during the dropwise addition. Stirring of the resulting mixture was further continued for ten minutes, and a solution of 0.22 g of the equimolar reaction product of acetone and ethylenediamine and 0.13 g diethylamine in 5 g N,N-dimethylacetamide was then added to effect termination reaction, thus giving a solution of elastic polyurethane. The measurements on this product are shown in Table 1 below.

TABLE 1

| | as-cast $\eta_{inh}$ | $\Delta IV_b$ | $\Delta IV_a$ | $\Delta IV_a/\Delta IV_b$ |
|---|---|---|---|---|
| Example 1 | 0.852 | 0.803 | 0.403 | 0.502 |
| Example 2 | 0.854 | 1.050 | 0.447 | 0.426 |
| Example 3 | 0.908 | 1.033 | 0.412 | 0.399 |
| Example 4 | 1.033 | 0.862 | 0.263 | 0.203 |
| Comparative Example | 0.830 | 0.783 | 0.599 | 0.765 |

EXAMPLE 2

An experiment was carried out in much the same manner as in Example 1, except that 0.24 g of the equimolar reaction product of methyl ethyl ketone and ethylenediamine was used as the terminating agent in place of the equimolar reaction product of acetone and ethylenediamine. The result is also shown in Table 1.

EXAMPLE 3

An experiment was carried out in much the same manner as in Example 1, except that 0.27 g of the equimolar reaction product of diethyl ketone and ethylenediamine was used as the terminating agent in place of the equimolar reaction product of acetone and ethylenediamine. The result is also shown in Table 1.

EXAMPLE 4

An experiment was carried out in much the same manner as in Example 1, except that 0.27 g of the equimolar reaction product of methyl n-propyl ketone and ethylenediamine was used as the terminating agent in place of the equimolar reaction product of acetone and ethylenediamine. The result is also shown in Table 1.

COMPARATIVE EXAMPLE

To 196.8 g of a prepolymer solution in N,N-dimethylacetamide obtained in the same way as in Example 1, was added a solution of 1.08 g ethylenediamine and 0.17 g diethylamine in 30 g diemthylacetamide with rapid stirring. The viscosity began to increase immediately, and hence slower stirring was further continued for ten minutes, thus giving a solution of elastic polyurethane. The measurements are also shown in Table 1.

The elastic polyurethane articles obtained by the conventional methods have an isocyanate group blocked with a secondary monomer and an amino group as the terminal groups in the molecule, and the replacement reaction between these two terminal groups can occur even at room temperature; hence, "post-polymerization" which should take place only under the heated conditions in the step of after-treatment can occur even at room temperature, thus causing changes in the physical properties.

In contrast, elastic polyurethane articles having excellent physical properties, which cause "post-polymerization" by heating in the step of after-treatment but hardly cause "post-polymerization" at temperatures close to room temperature, can be easily and stably obtained by the process of this invention.

What we claim is:

1. A dope for forming elastic polyurethane articles prepared by using, as main reaction components, a polyol, a diisocyanate and a diamine, which also contains a solvent and a terminating agent comprising (a) a secondary monoamine and (b) a ketoimine-amine and/or an aldoimineamine.

2. A process for producing elastic polyurethane articles by using the dope as defined in claim 1.

* * * * *